Patented July 2, 1929.

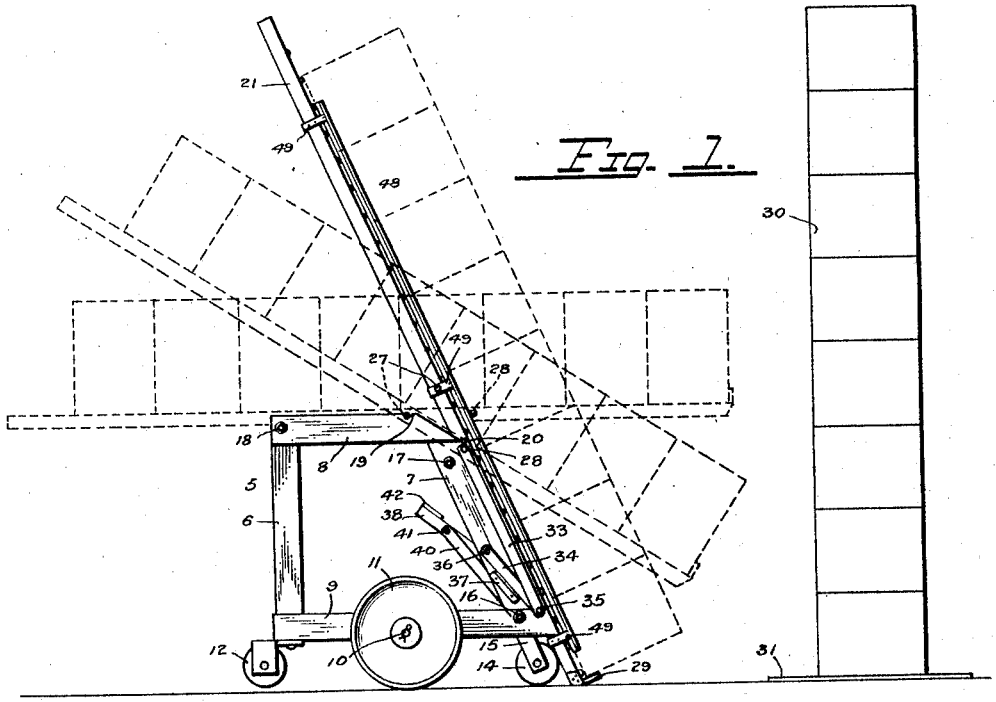

1,719,197

UNITED STATES PATENT OFFICE.

JAMES SCHLOTHAN, OF KETCHIKAN, ALASKA.

BOX PILING TRUCK.

Application filed January 25, 1928. Serial No. 249,289.

This invention relates to box piling trucks and is an improvement over my co-pending application of the same title, Serial Number 181,847, and filed April 7, 1927. The primary object of the present invention is to provide a truck wherewith one man may load, move and pile seven, eight or nine boxes of goods with ease and rapidity. Other objects are to provide a truck having a double pivotal movement with lever guide arms and stops whereby the roller body which carries the load may be readily and lightly swung to the floor and back again to a horizontal position. Further objects are to provide a lever arrangement for automatically stopping the roller body and retaining same in a horizontal position together with a release for said lever when it is desired to pivotally move said roller body. Still further objects are to provide a side rail for the roller body that may be shifted from one side to the other and which is for the purpose of serving as a straight edge in keeping the boxes in alignment when loaded upon the roller body.

With the above and other objects in view which will appear as the description proceeds, the invention consists of the novel construction, combination and arrangement of parts hereinafter described and claimed. These objects are accomplished by devices illustrated in the accompanying drawings; wherein:

Figure 1 is a view in side elevation of the truck with the roller body shown in several positions;

Fig. 2 is a top plan view of the truck; and

Fig. 3 is a view in longitudinal vertical section taken substantially on a broken line 3, 3 of Fig. 2.

Referring to the drawings throughout which like reference numerals designate like parts, the numeral 5 indicates the two side frames of the truck body each of which comprises a rear vertical member 6, a forward slanting member 7, an upper member 8 and a lower member 9. Said members are bolted or otherwise secured together in quadrilateral fashion and an axle 10 is mounted transversely of the two lower members with relatively large wheels 11 mounted thereon. A swivel wheel 12 is pivotally mounted in spaced transverse plates 13 whereby the truck may be easily guided. A forward wheel 14 is mounted between extension bracket arms 15 secured to the forward slanting frame members. Ordinarily the wheels 11 and 12 carry the load and the wheel 14 is normally raised slightly above the floor as clearly shown in Fig. 3 of the drawings.

A transverse rod 16 together with the axle 10 and plates 13 serve to retain the lower portions of the body frames 5 in spaced relation, and transverse rods 17 and 18 retain the upper portions of said body frames in corresponding relation. Each of the upper frame members 8 is provided with a slot 19 in its upper central edge portion substantially at points vertically above the axle 10. Two other transversely aligned slots 20 are provided in the forward inclined edges of the members 7 at points respectively a short distance forward and below the aforesaid slots.

The roller body comprises two side members 21 held in parallel spaced relation by transverse braces 22, 23, 24, 25 and 26. The brace 24 has upturned end portions that are secured to the exterior sides of the members 21 and two oppositely disposed pins 27 integral with said end portions and at points slightly forward of the center of gravity of the roller body are adapted to rest in the slots 19. Said roller body will then assume a horizontal position with the transverse brace 23 resting on the transverse rod 18 as clearly shown in Fig. 3.

Two other pins 28 are similarly disposed on the upturned end portions of the brace 25 at distances forward of the pins 27 equal to the distances between the slots 19 and 20. When the roller body is tilted forward to the intermediate position shown in dotted lines in Fig. 1, said pins will obviously engage the slots 20. Upon continuing to lower the forward end of the roller body the pins 27 will leave the slots 19 and said body will be entirely supported by the pins 28 resting in the slots 20. Thus the forward end of said roller body may be swung lightly to the floor as shown in full lines in Fig. 1.

A lip 29 is secured between the forward ends of the side members 21 for insertion under the boxes when it is desired to load a standing stack as designated by the numeral 30 in Fig. 1. It is usually necessary to pile the boxes on two laths, as indicated at 31, so that the lip may easily be inserted under the lowermost box as will be understood. In the completely lowered position for loading or unloading, the entire body frame will tilt forward with the forward wheel 14 in engagement with the floor and the rear swivel wheel slightly raised as also shown in Fig. 1.

Lever guides 32, each comprising an upper member 33 pivotally secured to the outer ends of the pins 28 and a lower member 34 pivotally connected with said upper member at 35 and pivoted to the forward frames 7 at 36, are provided on each side of the device. Said levers guide and stabilize the roller body in its pivotal movements, and stop plates 37 are secured to said frames in corresponding positions for impingement by the said lower lever arms to limit the downward swing of the roller body as will be readily understood from Fig. 1.

For the purpose of retaining the roller body in a normally horizontal position I have provided another lever arrangement. Said lever is centrally disposed and comprises an upper member 38 pivotally held by lugs 39 on the underside of the brace 26, and a lower member 40 pivotally connected to said upper member at 41 and pivoted at its lower end to the transverse rod 16. Said upper lever member is provided with an integral flange 42 arranged to engage the edge of the lower lever member when said members are in alignment and thus retain the roller body in a horizontal position as shown in Fig. 3.

The flange arrangement for the lever immediately above described will retain the members in somewhat rigid alignment and as a means for releasing said members when it is desired to pivotally lower the roller body I have provided a wire rod 43 having a handle 44. Said rod passes through a guide 45 on the upper side of the transverse brace 22 and through another guide 46 on the underside of the brace 25 and is then deflected downwardly with its hooked end engaging through one of a plurality of holes as designated by the numeral 47 in the upper lever member. A slight pull on the handle of said rod will release the lever members to pivotal function when the roller body may be swung to the floor.

As a means for serving as a straight edge for keeping the load of boxes in alignment, I have provided a side rail 48 disposed slightly above the rollers on the roller body as clearly shown in Fig. 1. Said rail is secured to one of the side members 21 of said roller body by means of three bracket supports 49, the center one of which is secured to the outer end of the pivot pin 27. It will be understood that said rail is interchangeable and may be shifted to the other side member by reversing and securing same thereto by means of bolt holes that are ordinarily provided.

My device is particularly adapted for use in moving boxed or crated canned goods such as salmon, fruits, vegetables, and the like and by its use one man may readily move from six to ten boxes with comparative ease. In the completely lowered position as shown in full lines in Fig. 1 the roller body will be inclined at an angle of substantially twenty-three degrees with the vertical. In this position one man may tilt the stack of boxes onto the roller body when loading and likewise straighten same to a vertical position when unloading. The width of the truck between the wheels 11 is slightly narrower than the lengths of the boxes so that same may pass between rows or piles of boxes when loading and unloading.

A very important function of my truck resides in its usage for removing boxes from roller tracks that are usually installed in canneries several feet above the flooring. In such usage the end of the roller body is engaged into the end of the roller track. The boxes are rolled on their narrow sides onto the roller body which is then disengaged from said track and with its load the truck is wheeled to the place where the boxes are to be piled.

Having thus described my invention, it being understood that minor changes may be resorted to in its construction without departing from its scope and spirit, what I claim and desire to secure by Letters Patent of the United States is:

1. A box piling truck comprising a truck body having a pair of transversely aligned slots disposed in its upper central edge portions, said body having a second pair of slots disposed forward and below the first named pair, a relatively long roller body, a pair of pivot pins for the roller body adjacent its center of gravity arranged to rest in the first named pair of slots when the roller body is disposed in a substantially horizontal position, a second pair of pivot pins for the roller body arranged to engage the second named pair of slots in support of said body when same is tilted downwardly, foldable lever arms pivotally connecting the sides of the truck and roller bodies, stop plates for said levers, and another foldable lever adapted to retain the roller body in a horizontal position when its two members are in aligned disposition.

2. A box piling truck comprising a truck body having a pair of transversely aligned slots disposed in its upper central edge portions, said body having a second pair of slots disposed forward and below the first named pair, a relatively long roller body, a pair of pivot pins for the roller body adjacent its center of gravity arranged to rest in the first named pair of slots when the roller body is disposed in a substantially horizontal position, a second pair of pivot pins for the roller body arranged to engage the second named pair of slots in support of said body when the same is tilted downwardly, foldable lever arms pivotally connecting the sides of the truck and roller bodies, stop plates for said levers, another foldable lever adapted to retain the roller body in a horizontal position when its two members are in aligned disposition, and trip means for releasing said lever members from their aligned position.

3. A box piling truck comprising a truck body having a pair of transversely aligned slots disposed in its upper central edge portions, said body having a second pair of slots disposed forward and below the first named pair, a relatively long roller body, a pair of pivot pins for the roller body adjacent its center of gravity arranged to rest in the first named pair of slots when the roller body is disposed in a substantially horizontal position, a second pair of pivot pins for the roller body arranged to engage the second named pair of slots in support of said body when same is tilted downwardly, foldable lever arms pivotally connecting the sides of the truck and roller bodies, stop plates for said levers, another foldable lever adapted to retain the roller body in a horizontal position when its two members are in aligned disposition, trip means for releasing said lever members from their aligned position, and an interchangeable side rail for the roller body adapted to retain its load of boxes in alignment.

In witness whereof, I hereunto subscribe my name this 16th day of January, A. D. 1928.

JAMES SCHLOTHAN.